United States Patent
Hyde et al.

(10) Patent No.: US 11,351,404 B2
(45) Date of Patent: Jun. 7, 2022

(54) VEHICLE WINDOW-BREAKING APPARATUS

(71) Applicant: Ford Global Technologies, LLC, Dearborn, MI (US)

(72) Inventors: Joseph David Hyde, Flint, MI (US); Nathan Kristofor Tardif, Ferndale, MI (US); Joseph Edward Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 750 days.

(21) Appl. No.: 16/357,358

(22) Filed: Mar. 19, 2019

(65) Prior Publication Data

US 2020/0298028 A1    Sep. 24, 2020

(51) Int. Cl.
| | |
|---|---|
| *A62B 3/00* | (2006.01) |
| *B60R 21/00* | (2006.01) |
| *F42B 3/00* | (2006.01) |
| *B60R 21/017* | (2006.01) |

(52) U.S. Cl.
CPC .............. *A62B 3/005* (2013.01); *B60R 21/00* (2013.01); *B60R 21/017* (2013.01); *F42B 3/006* (2013.01); *B60R 2021/0027* (2013.01)

(58) Field of Classification Search
CPC ....................................................... A62B 3/005
See application file for complete search history.

(56) References Cited

U.S. PATENT DOCUMENTS

| | | | |
|---|---|---|---|
| 5,318,145 A | 6/1994 | Vollmer | |
| 7,988,078 B1 | 8/2011 | Roy et al. | |
| 8,727,060 B1 | 5/2014 | Erickson et al. | |
| 10,894,175 B1* | 1/2021 | Hirsius | A62B 3/005 |
| 11,225,214 B2* | 1/2022 | Hyde | B60Q 9/00 |
| 2004/0050607 A1 | 3/2004 | Souther | |
| 2010/0289630 A1* | 11/2010 | Suzuki | G08B 13/04 |
| | | | 340/426.1 |
| 2017/0341613 A1 | 11/2017 | Huang | |
| 2021/0346727 A1* | 11/2021 | Hirsius | B60J 1/20 |

FOREIGN PATENT DOCUMENTS

| | | | |
|---|---|---|---|
| CN | 203410409 U | * 1/2014 | |
| GB | 2412687 A | * 10/2005 | A62B 3/005 |
| WO | 2011122941 A1 | 10/2011 | |
| WO | 2016141502 A1 | 9/2016 | |

* cited by examiner

*Primary Examiner* — Nicole T Verley
(74) *Attorney, Agent, or Firm* — Frank A. MacKenzie; Bejin Bieneman PLC

(57) ABSTRACT

An apparatus includes a door frame, a carriage movable along a path relative to the door frame, a window, a bolt fixing the window to the carriage, a housing fixed to the window by the bolt, a striker mounted in the housing, and a pyrotechnic charge positioned to drive the striker into the window.

15 Claims, 6 Drawing Sheets

VEHICLE WINDOW-BREAKING APPARATUS

BACKGROUND

When a vehicle enters a body of water, an occupant has approximately 1 or 2 minutes to exit the vehicle before the vehicle sinks. If the door is underwater, pressure from the water will prevent the occupant from opening the door. After between 30 seconds and 1 minute, the water rises to the bottom of the window of the vehicle. Once the water is above the bottom of the window, pressure from the water pushes the window against the frame of the door, preventing the window from opening. In order to exit the vehicle, the occupant must either shatter the window or wait until water has completely filled the passenger cabin, equalizing the pressure and allowing the door to open.

DETAILED DESCRIPTION

Figure 1:
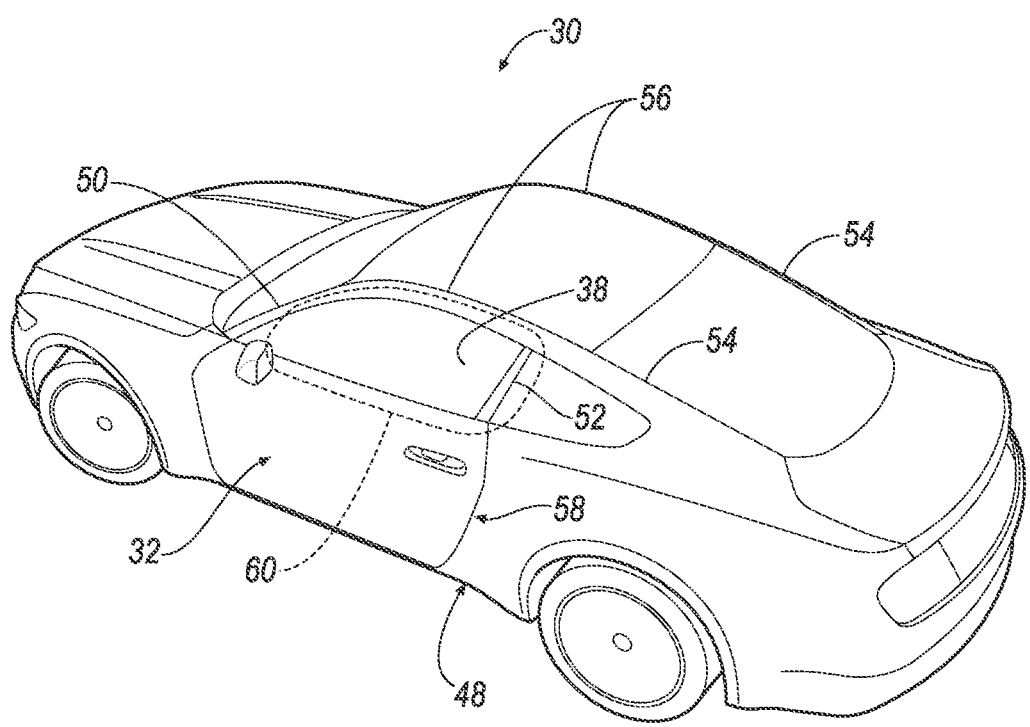
FIG. 1 is a perspective view of a vehicle.

An apparatus includes a door frame, a carriage movable relative to the door frame, a window, a bolt fixing the window to the carriage, a housing fixed to the window by the bolt, a striker mounted in the housing, and a pyrotechnic charge positioned to drive the striker into the window.

The apparatus may further include a controller programmed to discharge the pyrotechnic charge in response to data indicating that a vehicle including the apparatus is submerged. The programming to discharge the pyrotechnic charge may include programming to wait for a delay period from receiving the data that the vehicle is submerged before discharging the pyrotechnic charge. The apparatus may further include a side curtain airbag coupled to the door frame and communicatively coupled to the controller, and the delay period may be at least as long as an inflation time of the side curtain airbag.

The apparatus may further include a controller programmed to discharge the pyrotechnic charge in response to data indicating that a rollover event has occurred and ended.

The striker may be positioned one of inboard or outboard of the window and may have a discharge direction, and the housing may extend along the other of inboard or outboard of the window intersecting the discharge direction.

The housing may include a tunnel extending from the pyrotechnic charge to the window, and the striker is positioned in the tunnel. The tunnel may be a first tunnel, the striker may be positioned one of inboard or outboard of the window, and the housing may include a second tunnel positioned the other of inboard or outboard of the window and aligned with the first tunnel.

The window may include a display portion and an extension extending downward from the display portion, and the display portion may be exposed when the window is in a fully raised position relative to the door frame, and the bolt may extend through the extension.

The bolt may be a first bolt, and the apparatus may further include a second bolt fixing the window to the carriage, and the second bolt may be spaced from the housing. The window may include a display portion, a first extension extending downward from the display portion, and a second extension extending downward from the display portion. The display portion may be exposed when the window is in a fully raised position relative to the door frame, the first bolt may extend through the first extension, and the second bolt may extend through the second extension. The window may include a bridging portion extending downward from the display portion and extending from the first extension to the second extension, and the first extension and second extension may extend further downward than the bridging portion.

The striker may include a conical section having a point aimed at the window.

The striker may be disposed below the bolt.

The window may be tempered glass.

An apparatus 32 for a vehicle 30 includes a door frame 34, a carriage 36 movable along a path relative to the door frame 34, a window 38, a first bolt 40 fixing the window 38 to the carriage 36, a housing 42 fixed to the window 38 by the first bolt 40, a striker 44 mounted in the housing 42, and a pyrotechnic charge 46 positioned to drive the striker 44 into the window 38.

The apparatus 32 can break the window 38, permitting an occupant to exit the vehicle 30 in the event that the vehicle 30 becomes submerged or rolls over, or some other event that prevents a door 58 from opening. The apparatus 32 can provide an efficient packaging design with a small number of components, e.g., the same first bolt 40 attaches the window 38 to the carriage 36 and the housing 42 of the striker 44 to the window 38. The housing 42 can be located within the cavity of the door 58, where the housing 42 is easier to conceal.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a body 48. The vehicle 30 may be of a unibody construction, in which a frame and the body 48 of the vehicle 30 are a single component. The vehicle 30 may, alternatively, be of a body-on-frame construction, in which the frame supports the body 48 that is a separate component from the frame. The frame and the body 48 may be formed of any suitable material, for example, steel, aluminum, etc.

The body 48 of the vehicle 30 may include A pillars 50, B pillars 52, C pillars 54, and roof rails 56. The A pillars 50 may extend between a windshield and the doors 58. The B pillars 52 may extend between adjacent doors 58 if the vehicle 30 is four-door or between doors 58 and body panels if the vehicle 30 is two-door. The C pillars 54 may extend between the doors 58 or body panel and a backlite. The body 48 may also include D pillars (not shown) if the vehicle 30 is, e.g., an SUV, crossover, minivan, or station wagon, in which case the C pillars 54 extend between rear doors 58 and body panels, and the D pillars extend between the body panels and the backlite. The roof rails 56 extend along the windows 38 from the A pillar 50 to the B pillar 52 to the C pillar 54.

A side curtain airbag 60 is fixed to each roof rail 56 and is coupled to the door frame 34 via the body 48. The side curtain airbag 60 is inflatable from an uninflated position to an inflated position, as shown in FIG. 1. The side curtain airbag 60 in the uninflated position is folded inside the respective roof rail 56. The side curtain airbag 60 in the inflated position extends adjacent at least one of the doors 58. The side curtain airbag 60 in the inflated position may cover the window 38 when the window 38 is in a fully raised position. The side curtain airbag 60 in the inflated position may extend from the A pillar 50 to the B pillar 52 (or B pillar 52 to C pillar 54 for a rear door 58).

Figure 2:
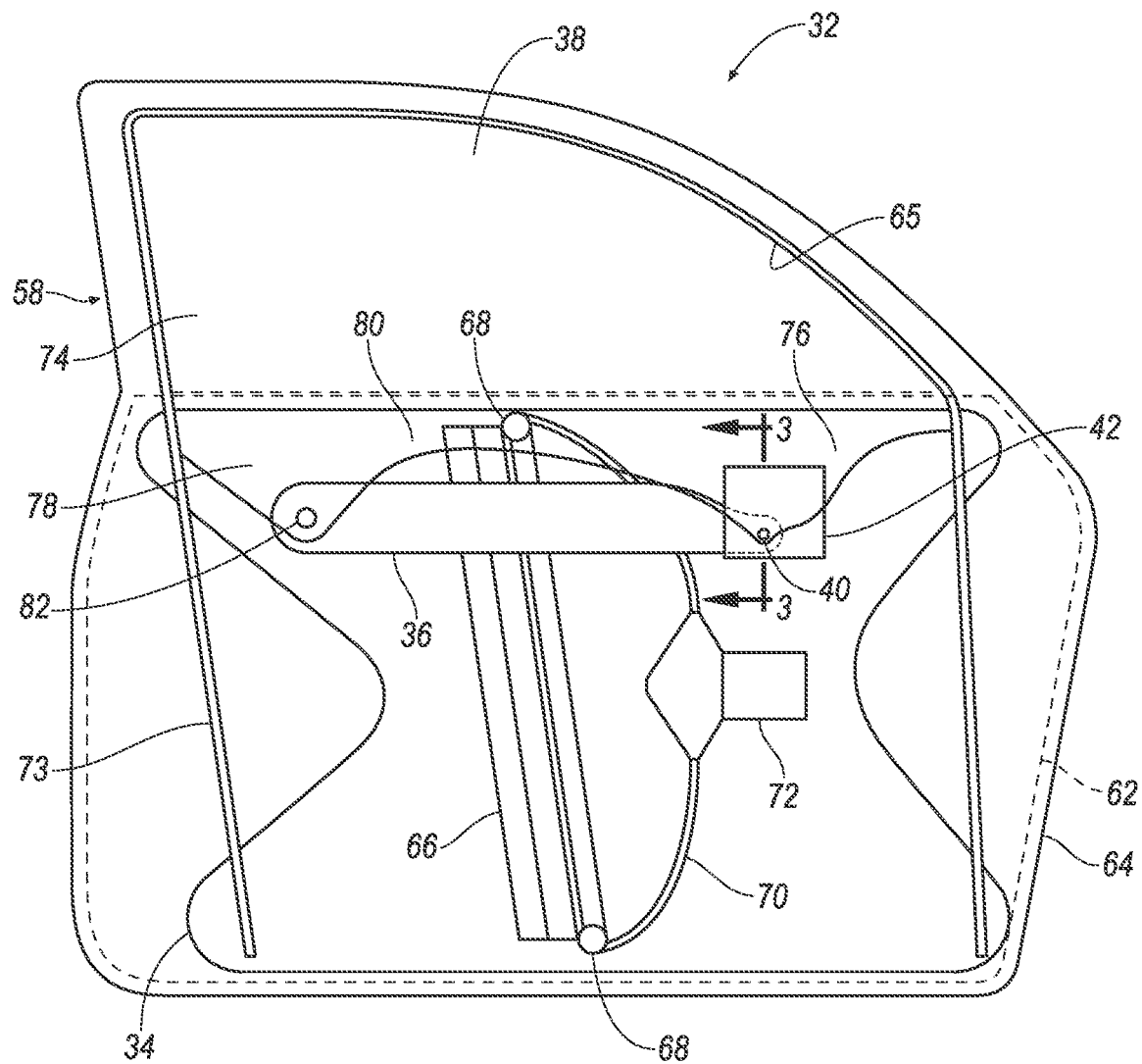
FIG. 2 is a plan view of a door of the vehicle with a door outer removed for illustration.

With reference to FIG. 2, the vehicle 30 includes the doors 58 openable for occupants to enter and exit a passenger cabin. The roof rails 56 contact a top edge of the doors 58, as shown in FIG. 1. Each door 58 includes a door trim 62, the door frame 34, and a door panel 64. The door trim 62 and the door panel 64 are fixed relative to the door frame 34. The door trim 62 is fixed opposite the door panel 64 relative to the door frame 34. The door trim 62 is inboard relative to the door frame 34, and the door panel 64 is outboard relative to the door frame 34. The door 58 includes a window opening 65, an opening completely closed by the window 38 if the window 38 is in a fully raised position. The window opening 65 is defined by the door trim 62 and door panel 64 on a bottom edge and either by the door 58 circumscribing the window opening 65 or by the body 48, e.g., the A pillar 50, the B pillar 52, and the roof rail 56.

The door panel 64 faces outboard relative to the vehicle 30. The door panel 64 may present a class-A surface, i.e., a surface specifically manufactured to have a high-quality, finished aesthetic appearance free of blemishes. The door panel 64 may be, for example, formed of steel, aluminum, fiber reinforced plastic composite, etc.

The door frame 34 may be formed of a metal such as steel or aluminum, a fiber reinforced plastic composite, etc., and provides structural rigidity for the door 58. The door frame 34 may provide a mounting location for components of the door 58.

The door trim 62 may be formed of materials suitable for an interior of the vehicle 30, such as vinyl, plastic, leather, wood, etc.

At least one track 66 is elongated inside the door 58. The track 66 is fixed to the door frame 34. The track 66 is oriented generally vertically and defines a path along which the window 38 can move, i.e., up and down.

The carriage 36 is movable along a path relative to the door frame 34. The carriage 36 is shaped to engage with the track 66, e.g., with a corresponding cross-section, permitting the carriage 36 to move along the track 66 while keeping the same orientation relative to the track 66. The carriage 36 provides support for the window 38, and the movement of the carriage 36 lifts and lowers the window 38.

Pulleys 68 are disposed at a top and at a bottom of the track 66. The pulleys 68 are freely rotatable relative to the track 66. The pulleys 68 are disc-shaped with a channel extending circumferentially around them.

A cord 70 is fixed to the carriage 36 and extends from the carriage 36 to the pulleys 68 and extends from the pulleys 68 to an electric motor 72. The cord 70 is seated in the channels of the pulleys 68. As the cord 70 moves along its length, the cord 70 rotates the pulleys 68 and pulls the carriage 36 up or down.

The electric motor 72 is fixed to the door frame 34. The electric motor 72 may be any suitable type for raising and lowering the window 38. The electric motor 72 is actuatable to move the cord 70 along the length of the cord 70 in either of two directions. As the cord 70 moves, the cord 70 pulls the carriage 36 along the track 66 either upward or downward.

The window 38 is fixed to the carriage 36 and is movable with the carriage 36. The window 38 is movable with the carriage 36 to a fully raised position, a fully lowered position, or some position between the fully raised and lowered positions. In the fully raised position, the window 38 is closed against the top of the door 58. In the fully lowered position, the window 38 is fully or partially concealed behind the door trim 62 and leaves a gap in the window opening 65 in the door 58 above the window 38.

A window track 73 is fixed to the door 58, e.g., to the door frame 34. The window track 73 is positioned to help guide the window 38 as the window 38 moves up and down. The window track 73 extends along a portion of the window opening 65, specifically, the portion of the window opening 65 that is spaced from the door trim 62 and/or door panel 64. The window track 73 extends between the door trim 62 and the door panel 64 in two sections each parallel to the track 66.

The window 38 is made of tempered glass. Tempering glass causes the outer surface to be in compression and the interior in tension, so when tempered glass breaks, the pieces are small granular chunks rather than shards. The tempered glass of the window 38 may also be laminated, i.e., may include an interlayer of a plastic sheet of polyvinyl butyral (PVB) or ethylene-vinyl acetate (EVA) to which the glass is bonded, so when the glass shatters, the interlayer holds the pieces of glass together.

The window 38 includes a display portion 74, a first extension 76, a second extension 78, and a bridging portion 80. The display portion 74 is exposed, i.e., not concealed by the door panel 64 and door trim 62, when the window 38 is in the fully raised position. The first extension 76, second extension 78, and bridging portion 80 extend downward from the display portion 74. The bridging portion 80 extends from the first extension 76 to the second extension 78. The first extension 76 and the second extension 78 extend farther downward than the bridging portion 80.

The first bolt 40 and a second bolt 82 fix the window 38 to the carriage 36. The first bolt 40 extends through the first extension 76, and the second bolt 82 extends through the second extension 78. The first bolt 40 extends through the housing 42, and the second bolt 82 is spaced from the housing 42.

Figure 3A:
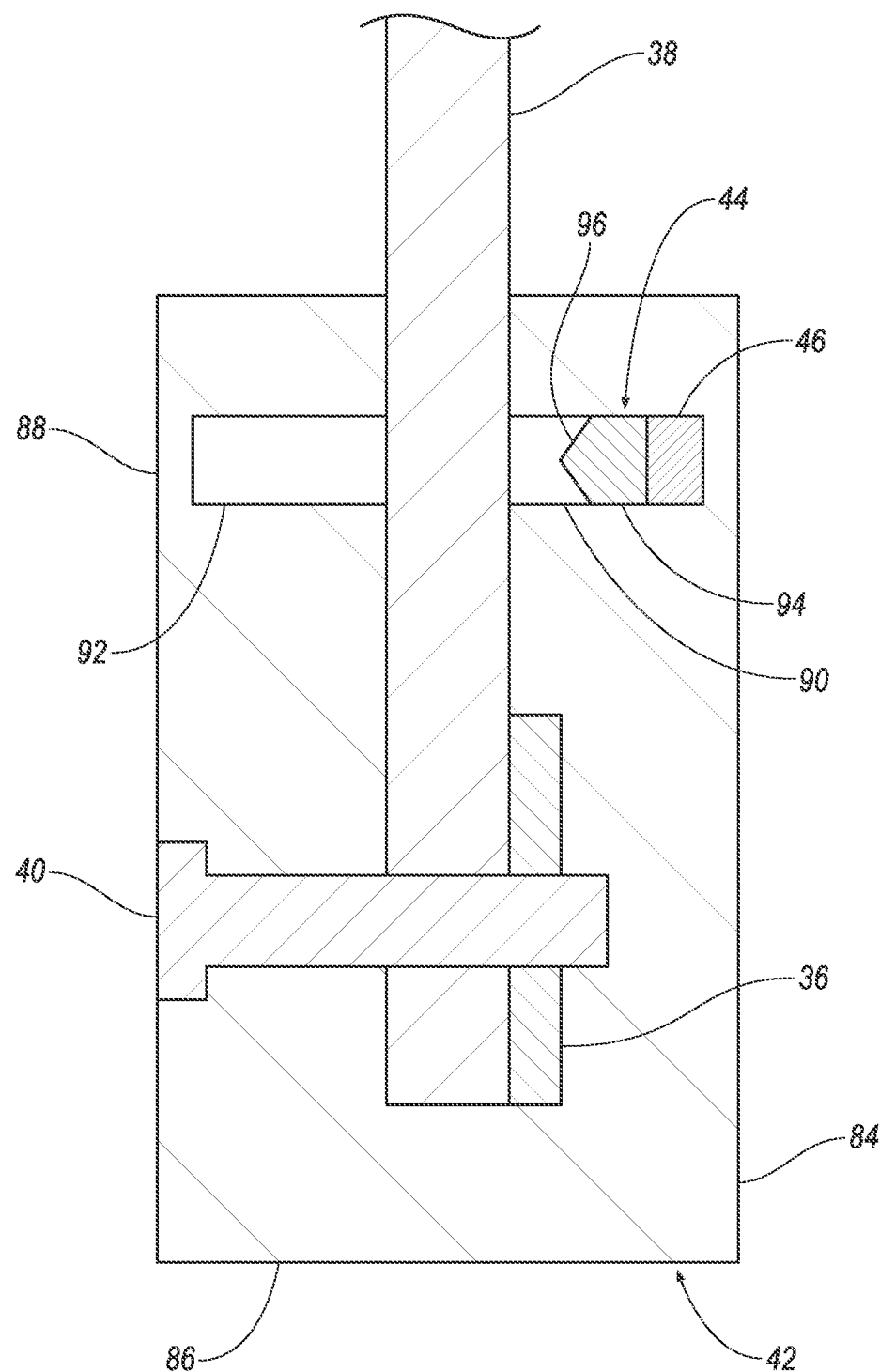
FIG. 3A is a cross-sectional view of a housing of the door.

With reference to FIG. 3A, the housing 42 is fixed to the window 38 by the first bolt 40. The housing 42 extends along an inboard side of the window 38 and along an outboard side of the window 38. The housing 42 includes an inboard portion 84, a connecting portion 86, and an outboard portion 88. The inboard portion 84 extends along the inboard side of the window 38. The connecting portion 86 is connected to the inboard portion 84 and the outboard portion 88, and the connecting portion 86 extends below the window 38. The outboard portion 88 extends along the outboard side of the window 38. The outboard portion 88 extends directly across the window 38 from the inboard portion 84. The outboard portion 88 and the inboard portion 84 may have a matching shape.

The housing 42 includes a first tunnel 90 extending from the pyrotechnic charge 46 to the window 38. The first tunnel 90 may extend through the inboard portion 84 (as shown in FIG. 3) or through the outboard portion 88. The housing 42 includes a second tunnel 92 extending through the opposite of the inboard portion 84 and the outboard portion 88 as the first tunnel 90. The second tunnel 92 aligns with the first tunnel 90, i.e., is oriented in the same direction as the first tunnel 90 and is positioned directly across the window 38 from the first tunnel 90. The second tunnel 92 terminates at an end inside the housing 42. The first tunnel 90 and the second tunnel 92 are disposed below the first bolt 40.

The pyrotechnic charge 46 is positioned in the first tunnel 90. The pyrotechnic charge 46 is positioned to drive the striker 44 into the window 38. The pyrotechnic charge 46 is positioned farther from the window 38 from the striker 44, and the striker 44 is positioned between the pyrotechnic charge 46 and the window 38. The pyrotechnic charge 46 is positioned at an end of the first tunnel 90, so that when the pyrotechnic charge 46 discharges, the force of the discharge is directed into the striker 44.

The pyrotechnic charge 46 may be combustible to produce a gas. The pyrotechnic charge 46 may be formed of a solid mixture of substances that, when ignited, react to produce the gas. For example, the pyrotechnic charge 46 may be formed of sodium azide ($NaNO_3$), potassium nitrate ($KNO_3$), and silicon dioxide ($SiO_2$), which react to form nitrogen gas ($N_2$).

The striker 44 is mounted in the first tunnel 90 in the housing 42. The striker 44 is positioned below the first bolt 40. The striker 44 is positioned either inboard or outboard of the window 38 depending on the position of the first tunnel 90. The striker 44 has a discharge direction toward the window 38 defined by the pyrotechnic charge 46 and the direction of the first tunnel 90. The housing 42, e.g., the outboard portion 88 if the striker 44 is disposed inboard of the window 38, intersects the discharge direction of the striker 44 on the opposite side of the window 38 than the striker 44.

The striker 44 includes a conical section 94 and a cylindrical section 96. The conical section 94 has a point, and the striker 44 is oriented so that the point is aimed along the discharge direction at the window 38. The conical section 94 has a widest diameter equal to a diameter of the cylindrical section 96. The cylindrical section 96 has a cross-section matching a cross-section of the first tunnel 90 and of the second tunnel 92. The diameter of the cylindrical section 96 is slightly shorter than a diameter of the first tunnel 90.

Figure 3B:
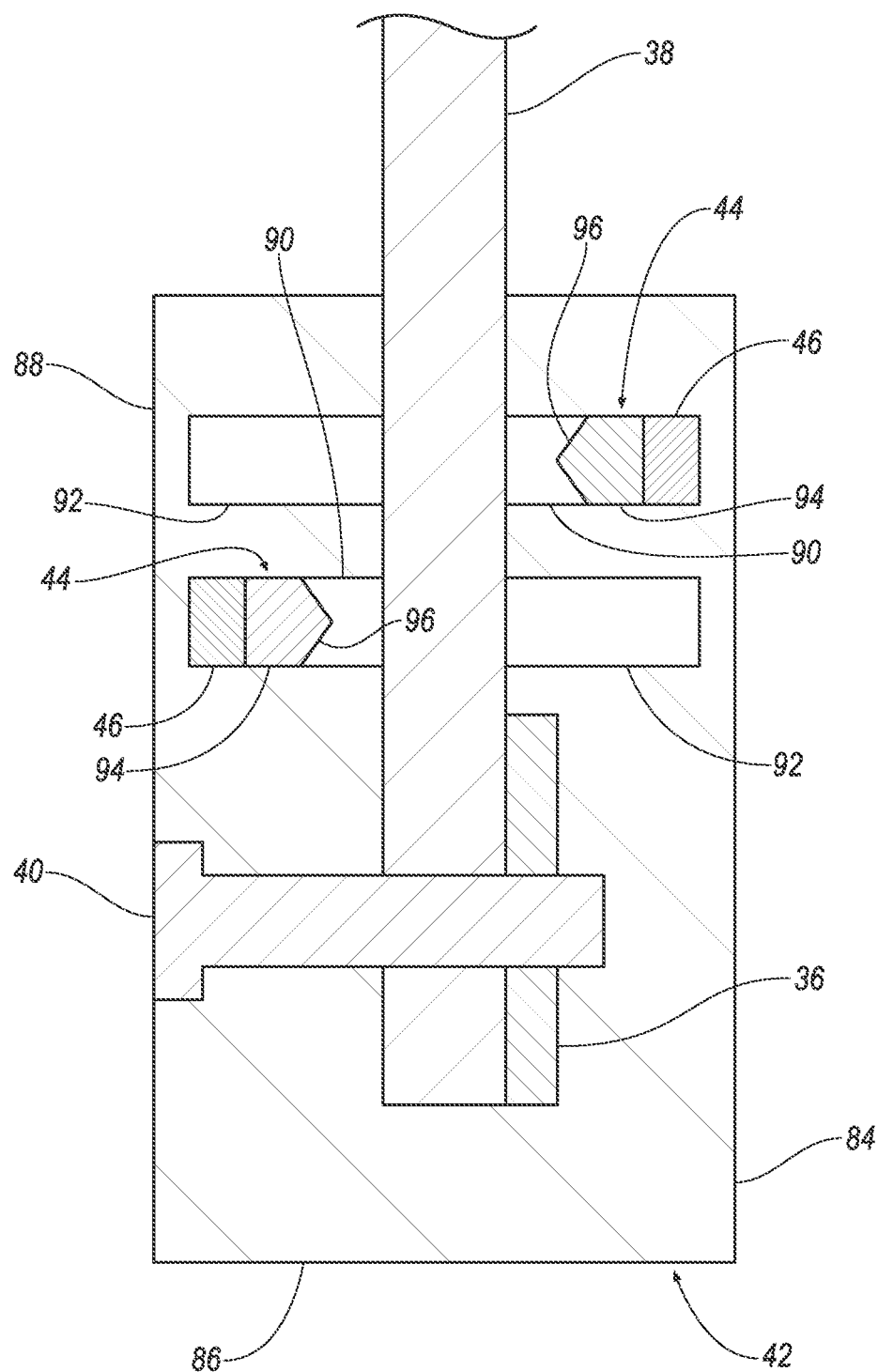
FIG. 3B is a cross-sectional view of another example of the housing of the door.

With reference to FIG. 3B, alternatively to including one striker 44, the apparatus 32 can include two strikers 44, along with the corresponding pyrotechnic charge 46, first tunnel 90, and second tunnel 92 for each striker 44. The strikers 44 are disposed on opposing sides of the window 38, i.e., one striker 44 is inboard of the window 38 and one striker 44 is outboard of the window 38. One set of the striker 44, pyrotechnic charge 46, first tunnel 90, and second tunnel 92 is arranged as described above, and the other set of the striker 44, pyrotechnic charge 46, first tunnel 90, and second tunnel 92 is arranged as described above but with inboard and outboard reversed. The two strikers 44 are useful if the window 38 is laminated glass because the strikers 44 can each break the glass on one side of the interlayer to which the glass is bonded, ensuring that the glass is broken on both sides of the interlayer.

Figure 4:
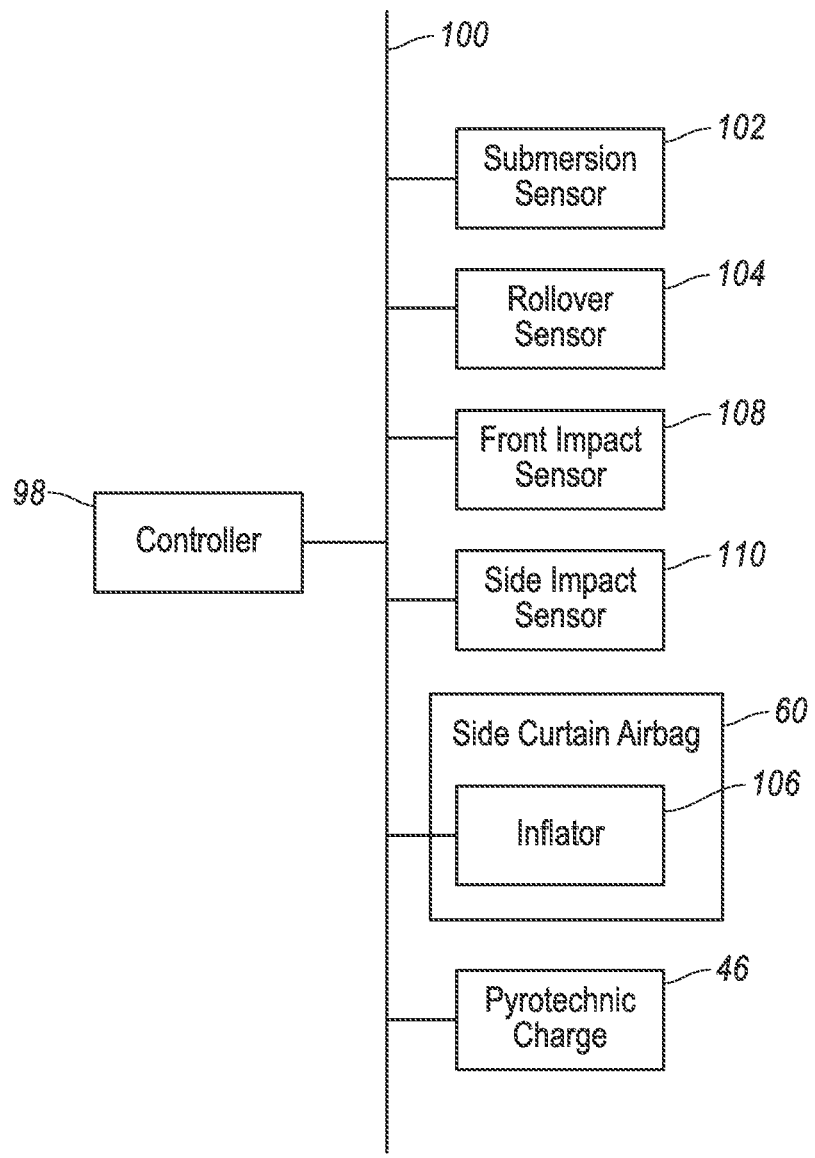
FIG. 4 is a block diagram of a control system for breaking a window of the door.

With reference to FIG. 4, a controller 98 is a microprocessor-based controller. The controller 98 includes a processor, a memory, etc. The memory of the controller 98 includes media for storing instructions executable by the processor as well as for electronically storing data and/or databases.

The controller 98 may transmit and receive data through a communications network 100 such as a controller area network (CAN) bus, Ethernet, WiFi, Local Interconnect Network (LIN), onboard diagnostics connector (OBD-II), and/or by any other wired or wireless communications network. The controller 98 may be communicatively coupled to a submersion sensor 102, a rollover sensor 104, a front impact sensor 108, a side impact sensor 110, an inflator 106 of the side curtain airbag 60, the pyrotechnic charge 46, and other components via the communications network 100.

The submersion sensor 102 is any sensor or sensors suitable for detecting that water is entering the vehicle 30. For example, the submersion sensor 102 may include two electrical leads that, when connected, close a circuit; when water is present between the leads, the conductivity of water changes to allow current to flow through the circuit where previously it would not have done so, or changes how much current is flowing by a known amount. For another example, the submersion sensor 102 may include an LED bulb, a light sensor, and possibly a prism reflecting light from the LED bulb to the light sensor; the presence of water scatters some of the light, reducing the light received by the light sensor by a known amount.

The rollover sensor 104 is any sensor or sensors suitable for determining that the vehicle 30 is in the process of a rollover. For example, the rollover sensor 104 can be an angular rate sensor.

The front and side impact sensors 108, 110 are adapted to detect an impact to the vehicle. The front impact sensor 108 is one or more sensors adapted to detect a frontal impact, and the side impact sensor 110 is one or more sensors adapted to detect a side impact. The impact sensors 108, 110 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensors 108, 110 may be located at numerous points in or on the vehicle.

The side curtain airbag 60 includes the inflator 106. Upon receiving a signal from, e.g., the controller 98, the inflator 106 may inflate the side curtain airbag 60 with an inflatable medium, such as a gas. The inflator 106 may be, for example, a pyrotechnic inflator that uses a chemical reaction to drive inflation medium to the side curtain airbag 60. The inflator 106 may be of any suitable type, for example, a cold-gas inflator.

Figure 5:
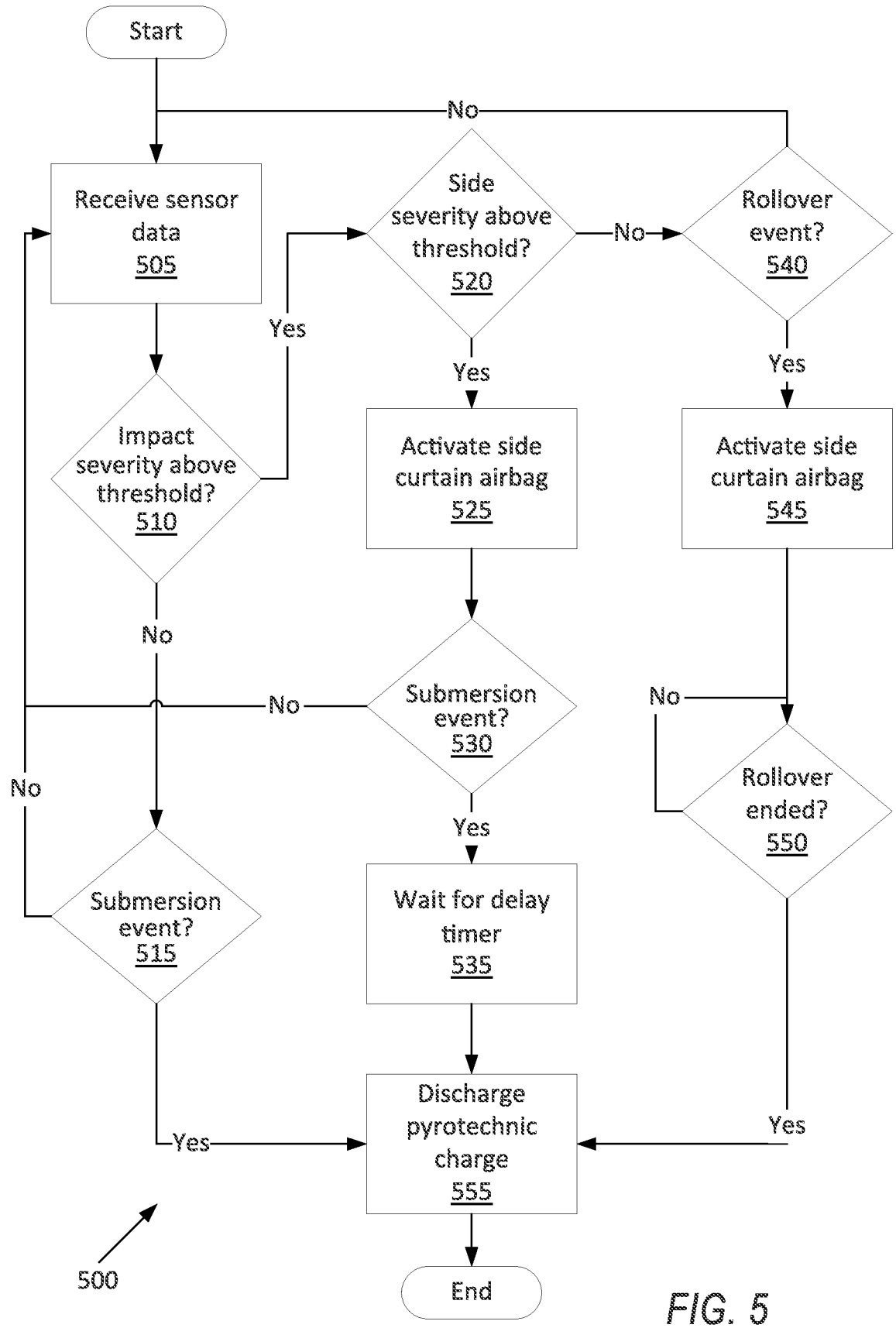
FIG. 5 is a process flow diagram of a process for breaking the window.

FIG. 5 is a process flow diagram illustrating an exemplary process for breaking the window 38. The memory of the controller 98 stores executable instructions for performing the steps of the process 500. As a general overview of the process 500, in the event of a rollover, the controller 98 activates the side curtain airbag 60 and once the rollover has ended discharges the pyrotechnic charge 46; in the event of the vehicle 30 becoming submerged, the controller 98 discharges the pyrotechnic charge 46; and in the event of the vehicle 30 experiencing a side impact and becoming submerged, the controller 98 activates the side curtain airbag 60 and then after a delay period discharges the pyrotechnic charge 46.

The process 500 begins in a block 505, in which the controller 98 receives data from the submersion sensor 102, the rollover sensor 104, and the impact sensors 108, 110 via the communications network 100.

Next, in a decision block 510, the controller 98 determines whether an impact to the vehicle 30 has occurred that exceeds an impact severity threshold. The impact severity threshold can be, e.g., a magnitude of acceleration or another physical quantity corresponding to an impact to the vehicle 30. The impact severity threshold can be chosen based on whether airbags of the vehicle 30 should deploy in response to the impact. If the impact exceeds the impact severity threshold, the process 500 proceeds to a decision block 520.

If the impact is below the impact severity threshold, the process 500 proceeds to a decision block 515.

In the decision block 515, the controller 98 determines whether the vehicle 30 is submerged. For example, the controller 98 determines whether the data from the submersion sensor 102 indicate the presence of water. If the vehicle 30 is not submerged, the process 500 returns to the block 505 to continue monitoring the sensor data. If the vehicle 30 is submerged, the process 500 proceeds to a block 555.

In the decision block 520, the controller 98 determines whether the impact exceeds a side impact severity threshold, i.e., whether the impact is a side impact, oblique impact, or offset impact. The side impact severity threshold can be, e.g., a lateral acceleration of the vehicle 30, a yaw acceleration of the vehicle 30, a combination of lateral and yaw acceleration, or some other quantity indicative of the impact types. The side impact severity threshold can be chosen to be below side impacts, oblique impacts, and offset impacts, and above frontal impacts. If the impact exceeds the side impact severity threshold, the process 500 proceeds to a block 525. If the impact is below the side impact severity threshold, the process 500 proceeds to a decision block 540.

In the block 525, the controller 98 activates the side curtain airbag 60, i.e., actuates the inflator 106 to inflate the side curtain airbag 60.

Next, in a decision block 530, the controller 98 determines whether the vehicle 30 is submerged, as described above with respect to the decision block 515. If the vehicle 30 is not submerged, the process 500 returns to the block 505 to continue monitoring the sensor data. If the vehicle 30 is submerged, the process 500 proceeds to a block 535.

In the block 535, the controller 98 waits for a delay period before the process 500 proceeds. The delay period is chosen to be at least as long as the inflation time of the side curtain airbag 60, i.e., the time from which the inflator 106 begins inflating to the time at which the side curtain airbag 60 is at a maximum inflation. For example, the delay period may be around 300 milliseconds. After the block 535, the process 500 proceeds to the block 555.

In the decision block 540, the controller 98 determines whether a rollover event is occurring. For example, the controller 98 may determine whether angular rate data from the rollover sensor 104 is above a threshold. The threshold can be chosen to be an angular rate that is sufficiently fast to indicate that the vehicle 30 is rolling over. If a rollover event is occurring, the process 500 proceeds to a block 545. If a rollover event is not occurring, the process 500 returns to the block 505 to continue monitoring the sensor data.

In the block 545, the controller 98 activates the side curtain airbag 60, i.e., actuates the inflator 106 to inflate the side curtain airbag 60.

Next, in a decision block 550, the controller 98 determines whether the rollover event has ended. For example, the controller 98 may determine whether the angular rate data from the rollover sensor 104 is substantially equal to zero. If the rollover event has not ended, the process 500 repeats the decision block 520 until the rollover event ends. If the rollover has ended, the process 500 proceeds to a block 555.

The block 555 occurs after the block 535, after the decision block 515 if the vehicle 30 is submerged and the impact was below the impact severity threshold, or after the decision block 550 once the rollover event has ended. In the block 555, the controller 98 discharges the pyrotechnic charge 46. The discharge of the pyrotechnic charge 46 increases the pressure between the end of the first tunnel 90 and the striker 44, causing the striker 44 to strike the window 38 at a sufficient speed to break the window 38. If the apparatus includes two strikers 44, the controller discharges both pyrotechnic charges 46 simultaneously. The window 38 may break into pieces if not laminated or may shatter and remain in one piece if laminated. If the window 38 is shattered and laminated, then an occupant of the vehicle 30 can relatively easily remove the window 38 from the door 58. The occupant can then exit the vehicle 30 through the window opening 65 of the door 58. After the block 555, the process 500 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An apparatus comprising:
   a door frame;
   a carriage movable relative to the door frame;
   a window;
   a bolt fixing the window to the carriage;
   a housing fixed to the window by the bolt;
   a striker mounted in the housing; and
   a pyrotechnic charge positioned to drive the striker into the window.

2. The apparatus of claim 1, further comprising a controller programmed to discharge the pyrotechnic charge in response to data indicating that a vehicle including the apparatus is submerged.

3. The apparatus of claim 2, wherein the programming to discharge the pyrotechnic charge includes programming to wait for a delay period from receiving the data that the vehicle is submerged before discharging the pyrotechnic charge.

4. The apparatus of claim 3, further comprising a side curtain airbag coupled to the door frame and communicatively coupled to the controller, wherein the delay period is at least as long as an inflation time of the side curtain airbag.

5. The apparatus of claim 1, further comprising a controller programmed to discharge the pyrotechnic charge in response to data indicating that a rollover event has occurred and ended.

6. The apparatus of claim 1, wherein the striker is positioned one of inboard or outboard of the window and has a discharge direction, and the housing extends along the other of inboard or outboard of the window intersecting the discharge direction.

7. The apparatus of claim 1, wherein the housing includes a tunnel extending from the pyrotechnic charge to the window, and the striker is positioned in the tunnel.

8. The apparatus of claim 7, wherein the tunnel is a first tunnel, the striker is positioned one of inboard or outboard of the window, and the housing includes a second tunnel positioned the other of inboard or outboard of the window and aligned with the first tunnel.

9. The apparatus of claim 1, wherein the window includes a display portion and an extension extending downward from the display portion, the display portion is exposed when the window is in a fully raised position relative to the door frame, and the bolt extends through the extension.

10. The apparatus of claim 1, wherein the bolt is a first bolt, the apparatus further comprising a second bolt fixing the window to the carriage, wherein the second bolt is spaced from the housing.

11. The apparatus of claim 10, wherein
the window includes a display portion, a first extension extending downward from the display portion, and a second extension extending downward from the display portion;
the display portion is exposed when the window is in a fully raised position relative to the door frame;
the first bolt extends through the first extension; and
the second bolt extends through the second extension.

12. The apparatus of claim 11, wherein the window includes a bridging portion extending downward from the display portion and extending from the first extension to the second extension, and the first extension and second extension extend further downward than the bridging portion.

13. The apparatus of claim 1, wherein the striker includes a conical section having a point aimed at the window.

14. The apparatus of claim 1, wherein the striker is disposed below the bolt.

15. The apparatus of claim 1, wherein the window is tempered glass.

\* \* \* \* \*